(12) United States Patent
Hato

(10) Patent No.: US 8,991,796 B2
(45) Date of Patent: Mar. 31, 2015

(54) MICRO-BUBBLE GENERATOR AND MICRO-BUBBLE GENERATION DEVICE

(75) Inventor: Yoko Hato, Imabari (JP)

(73) Assignee: Yoshinori Nakamoto, Hiroshima-shi (JP)

( * ) Notice: Subject to any disclaimer, the term of this patent is extended or adjusted under 35 U.S.C. 154(b) by 651 days.

(21) Appl. No.: 13/381,220

(22) PCT Filed: Oct. 4, 2010

(86) PCT No.: PCT/JP2010/067356
§ 371 (c)(1),
(2), (4) Date: Dec. 28, 2011

(87) PCT Pub. No.: WO2011/048935
PCT Pub. Date: Apr. 28, 2011

(65) Prior Publication Data
US 2012/0126436 A1 May 24, 2012

(30) Foreign Application Priority Data
Oct. 22, 2009 (JP) .................................. 2009-243930

(51) Int. Cl.
*B01F 3/04* (2006.01)
*A01K 63/04* (2006.01)
*B01F 5/00* (2006.01)

(52) U.S. Cl.
CPC ............ *A01K 63/042* (2013.01); *B01F 3/0451* (2013.01); *B01F 5/0068* (2013.01); *B01F 2003/04858* (2013.01)
USPC ........................................................ 261/79.2

(58) Field of Classification Search
USPC ......................................... 261/76, 79.1, 79.2
See application file for complete search history.

(56) References Cited

U.S. PATENT DOCUMENTS

| 4,614,596 A | * | 9/1986 | Wyness ......................... 210/754 |
| 4,908,049 A | * | 3/1990 | Yoshida et al. .................. 96/248 |

(Continued)

FOREIGN PATENT DOCUMENTS

| EP | 2103344 A1 | 9/2009 |
| FR | 2241333 A1 | 3/1975 |

(Continued)

OTHER PUBLICATIONS

International Search Report for International Application No. PCT/JP2010/067356 dated Dec. 7, 2010.

(Continued)

*Primary Examiner* — Charles Bushey
(74) *Attorney, Agent, or Firm* — Kratz, Quintos & Hanson, LLP

(57) ABSTRACT

An object is to provide a micro-bubble generator, etc., capable of efficiently generating bubbles having a particle size of a nanometer order. One aspect of the present invention is a micro-bubble generator provided with a swirl chamber, a fluid introduction opening connected to the swirl chamber, the fluid introduction opening for introducing fluid along a line tangent to an inner surface of the swirl chamber, and a discharge tube for guiding the fluid in the direction substantially perpendicular to the direction in which the fluid is introduced. The discharge tube penetrates a wall surface of the swirl chamber and protrudes to an interior of the swirl chamber. According to the present configuration, by isolating a path of the introduced fluid, a loss of kinetic energy of a swirl flow of the fluid can be reduced. Thus, the micro-bubble generator capable of reducing the size of the generated micro-bubbles can be obtained.

2 Claims, 5 Drawing Sheets

(56) References Cited

U.S. PATENT DOCUMENTS

| | | | |
|---|---|---|---|
| 5,350,543 A * | 9/1994 | Spradley | 261/36.1 |
| 5,865,995 A * | 2/1999 | Nelson | 210/205 |
| 6,207,064 B1 * | 3/2001 | Gargas | 210/752 |
| 6,464,210 B1 * | 10/2002 | Teran et al. | 261/79.2 |
| 6,551,518 B2 * | 4/2003 | Gargas | 210/748.2 |
| 7,472,893 B2 * | 1/2009 | Ohnari | 261/79.2 |
| 8,186,652 B2 * | 5/2012 | Matsumoto | 261/79.2 |
| 8,741,100 B2 * | 6/2014 | Duesel, Jr. | 159/4.01 |
| 2007/0069403 A1 * | 3/2007 | Schletz et al. | 261/76 |
| 2009/0201761 A1 * | 8/2009 | Matsuno et al. | 366/165.2 |
| 2009/0294996 A1 | 12/2009 | Matsumato | |
| 2011/0245750 A1 * | 10/2011 | Lynch et al. | 604/5.01 |

FOREIGN PATENT DOCUMENTS

| | | |
|---|---|---|
| JP | 2003-225546 A | 8/2003 |
| JP | 2003-225546 A1 | 8/2003 |
| JP | 2006-122813 A1 | 5/2006 |
| JP | 4118939 B | 5/2008 |
| JP | 2008-237996 A | 10/2008 |
| JP | 2008-237996 A1 | 10/2008 |
| JP | 2008-246268 A1 | 10/2008 |
| JP | 2008-272719 A | 11/2008 |
| WO | WO 2007/089013 A1 | 8/2007 |

OTHER PUBLICATIONS

Extended European Search Report dated Dec. 5, 2013, in the corresponding European patent application No. 10824784.2.

Office Action dated Jan. 11, 2013, corresponding to New Zealand Patent Application No. 598823, with English translation.

Office Action dated May 20, 2014, corresponding Chinese Patent Application No. 201080042484.6.

\* cited by examiner

MICRO-BUBBLE GENERATOR AND MICRO-BUBBLE GENERATION DEVICE

TECHNICAL FIELD

The present invention relates to a micro-bubble generator and a micro-bubble generation device.

BACKGROUND ART

In recent years, gas-liquid mixture fluid containing micro bubbles is used in various industries, such as, for dissolution of a dysoxic water mass in a closed water area, an activation means of microorganisms in drainage treatment, growth facilitation of plants in hydroponics and the like, and removal of contaminating substances on a substance surface, as a technique capable of supplying various gases into water by making such gases in the form of micro bubbles.

For example, in Japanese Unexamined Patent Application No. 2003-182158, a spare swirl portion is provided in order to rectify a liquid introduced from a liquid introduction opening into a gas-liquid swirl chamber, and a swirl flow is generated to a wall surface in which a gas introduction opening is provided, the wall surface being orthogonal to a surface in which the liquid introduction opening is arranged. While generating the swirl flow, the liquid turns backward at the wall surface in which the gas introduction opening is provided, and a gas is drawn by utilizing negative pressure of the swirl flow and discharged to a discharge opening toward an opposite wall surface in which the discharge opening is provided.

In Japanese Unexamined Patent Application No. 2008-272719, a plurality of annular grooves is provided in such a manner that gas-liquid mixture fluid introduced into a gas-liquid swirl chamber is not expanded in the axial direction, and a swirl flow of the gas-liquid mixture fluid is generated to a wall surface in which a gas-liquid mixture fluid introduction opening is not provided, the wall surface being orthogonal to a surface in which the gas-liquid mixture fluid introduction opening is arranged. The gas-liquid mixture fluid turns backward at the wall surface, goes toward an opposite wall surface in which a discharge opening is provided while increasing swirl speed, and is discharged to the discharge opening.

PRIOR ART DOCUMENT

Patent Document

Patent Document 1: Japanese Unexamined Patent Application No. 2003-182158
Patent Document 2: Japanese Unexamined Patent Application No. 2008-272719

SUMMARY OF THE INVENTION

Problems to be Solved by the Invention

Any of the above swirl type micro-bubble generation devices reduces the size of bubbles but does not efficiently generate bubbles having a particle size of a nanometer order.

The present invention is achieved in consideration with the above background art, and an object thereof is to provide a micro-bubble generator, etc., capable of efficiently generating bubbles having a particle size of a nanometer order.

Means for Solving the Problems

According to this invention, in order to achieve the above object, configurations as described in the claims are adopted. Hereinafter, this invention will be described in detail.

A first aspect of the present invention is a micro-bubble generator, having:
a swirl chamber;
a fluid introduction opening connected to the swirl chamber, the fluid introduction opening for introducing fluid along a line tangent to an inner surface of the swirl chamber; and
a discharge tube for guiding the fluid in the direction substantially perpendicular to the direction in which the fluid is introduced, wherein
the discharge tube penetrates a wall surface of the swirl chamber and protrudes to an interior of the swirl chamber.

According to the present configuration, by isolating a path of the introduced fluid, a loss of kinetic energy of a swirl flow of the fluid can be reduced. Thus, the micro-bubble generator capable of reducing the size of generated micro bubbles can be obtained.

A second aspect of the present invention is the micro-bubble generator as described above, wherein
a central axis of the discharge tube in the swirl chamber is provided in the direction substantially perpendicular to the direction in which the fluid is introduced.

According to the present configuration, by isolating the path of the introduced fluid, the loss of the kinetic energy of the swirl flow of the fluid can be reduced. Thus, the micro-bubble generator capable of reducing the size of the generated micro bubbles can be obtained.

A third aspect of the present invention is the micro-bubble generator as described above, having:
the swirl chamber;
the fluid introduction opening connected to the swirl chamber, the fluid introduction opening for introducing the fluid along the line tangent to the inner surface of the swirl chamber; and
the discharge tube for guiding the fluid in the direction substantially perpendicular to the direction in which the fluid is introduced, wherein
the fluid introduced from the fluid introduction opening circulates around a circumference of the discharge tube, and then flows from one end of the discharge tube to the other end, and is discharged.

According to the present configuration, by isolating the path of the introduced fluid, the loss of the kinetic energy of the swirl flow of the fluid can be reduced. Thus, the micro-bubble generator capable of reducing the size of the generated micro bubbles can be obtained.

A fourth aspect of the present invention is the micro-bubble generator as described above, wherein
the one end of the discharge tube is positioned close to a wall surface of the swirl chamber facing the wall surface that the discharge tube penetrates.

According to the present configuration, by isolating the path of the introduced fluid, the loss of the kinetic energy of the swirl flow of the fluid can be reduced. Thus, the micro-bubble generator capable of reducing the size of the generated micro bubbles can be obtained.

A fifth aspect of the present invention is a micro-bubble generation device, having:
the micro-bubble generator as described above; and
a fluid storage tank accommodating the micro-bubble generator and storing micro-bubble generator and storing micro-bubble containing fluid.

A sixth aspect of the present invention is a micro-bubble generator, having:
a swirl chamber having a space in which a fluid is capable of swirling;
a fluid introduction opening for introducing the fluid along a line tangent to an inner surface of the swirl chamber; and a discharge tube, wherein the swirl chamber is provided with a first wall surface substantially orthogonal to a surface of the swirl chamber in which the fluid introduction opening is arranged, and a second wall surface facing the first wall surface, and the discharge tube penetrates the second wall surface and protrudes to an interior of the swirl chamber.

According to the present configuration, by isolating the path of the introduced fluid, the loss of the kinetic energy of the swirl flow of the fluid can be reduced. Thus, the micro-bubble generator capable of reducing the size of the generated micro bubbles can be obtained.

A seventh aspect of the present invention is a micro-bubble generator, having:

a swirl chamber having a space in which a fluid is capable of swirling;

a fluid introduction opening for introducing the fluid along a line tangent to an inner surface of the swirl chamber; and a discharge tube, wherein a first wall surface orthogonal to a surface of the swirl chamber in which the fluid introduction opening is arranged, and a second wall surface facing the first wall surface are provided in the swirl chamber, and the discharge tube is positioned on a substantially central axis line of the swirl chamber, penetrates the second wall surface, and reaches to a position close to the first wall surface.

According to the present configuration, by isolating the path of the introduced fluid, the loss of the kinetic energy of the swirl flow of the fluid can be reduced. Thus, the micro-bubble generator capable of reducing the size of the generated micro bubbles can be obtained.

An eighth aspect of the present invention is a micro-bubble generation device, including:

a micro-bubble generator having a swirl chamber, a fluid introduction opening connected to the swirl chamber, the fluid introduction opening for introducing fluid along a line tangent to an inner surface of the swirl chamber, and a discharge tube for guiding the fluid in the direction substantially perpendicular to the direction in which the fluid is introduced, wherein the discharge tube penetrates a wall surface of the swirl chamber and protrudes to an interior of the swirl chamber; and a fluid storage tank accommodating the micro-bubble generator and storing micro-bubble containing fluid, wherein the micro-bubble containing fluid discharged vertically upward from the fluid storage tank is obtained.

A ninth aspect of the present invention is a micro-bubble generation device, including:

a micro-bubble generator having a swirl chamber, a fluid introduction opening connected to the swirl chamber, the fluid introduction opening for introducing gas-liquid mixture fluid along a line tangent to an inner surface of the swirl chamber, and a discharge tube for guiding the gas-liquid mixture fluid in the direction substantially perpendicular to the direction in which the gas-liquid mixture fluid is introduced, wherein the discharge tube penetrates a wall surface of the swirl chamber and protrudes to an interior of the swirl chamber, and the gas-liquid mixture fluid introduced from the fluid introduction opening circulates around a circumference of the discharge tube, and then flows from one end of the discharge tube to the other end; and a fluid storage tank accommodating the micro-bubble generator and storing micro-bubble containing fluid, wherein the micro-bubble containing fluid discharged vertically upward from the fluid storage tank is obtained.

A tenth aspect of the present invention is a micro-bubble generation device, including:

a micro-bubble generator having a swirl chamber, a fluid introduction opening connected to the swirl chamber, the fluid introduction opening for introducing gas-liquid mixture fluid along a line tangent to an inner surface of the swirl chamber, and a discharge tube for guiding the gas-liquid mixture fluid in the direction substantially perpendicular to the direction in which the gas-liquid mixture fluid is introduced, wherein the discharge tube penetrates a wall surface of the swirl chamber and protrudes to an interior of the swirl chamber, the gas-liquid mixture fluid introduced from the fluid introduction opening circulates around a circumference of the discharge tube, and then flows from one end of the discharge tube to the other end, the gas-liquid mixture fluid turns backward at a wall surface and flows in from the opened one end of the discharge tube, and the wall surface is a wall surface of the swirl chamber facing the wall surface that the discharge tube penetrates; and a fluid storage tank accommodating the micro-bubble generator and storing micro-bubble containing fluid, wherein the micro-bubble containing fluid discharged vertically upward from the fluid storage tank is obtained.

An eleventh aspect of the present invention is a micro-bubble generation device, including:

a micro-bubble generator provided with a cylindrical gas-liquid swirl chamber having a space in which a gas-liquid mixture fluid is capable of swirling, a gas-liquid introduction cylinder including a gas-liquid introduction opening for introducing the gas-liquid mixture fluid along a line tangent to an inner surface of the gas-liquid swirl chamber, a gas-liquid introduction cylinder including a gas-liquid introduction opening for introducing the gas-liquid mixture fluid along a line tangent to an inner surface of the gas-liquid swirl chamber, a first wall surface orthogonal to a surface in which the gas-liquid introduction opening is arranged, a second wall surface facing the first wall surface, the second wall surface being positioned close to the gas-liquid introduction opening, and a gas-liquid discharge opening positioned on a central axis line of the cylindrical gas-liquid swirl chamber, the gas-liquid discharge opening penetrating the second wall surface and reaching to a position close to the first wall surface;

a pump for supplying the fluid to the micro-bubble generator;

a suction piping connected to a suction opening of the pump;

a discharge piping connected to a discharge opening of the pump and connected to the gas-liquid introduction opening;

a cylindrical casing forming a gas-liquid mixture fluid storage tank accommodating the micro-bubble generator and storing micro-bubble containing fluid discharged from the micro-bubble generator;

a semi-spherical third wall surface forming an upper part of the gas-liquid mixture fluid storage tank;

a storage tank discharge opening positioned in an upper part of a central axis line of the gas-liquid mixture fluid storage tank, the storage tank discharge opening penetrating the third wall surface;

a semi-spherical fourth wall surface forming a lower part of the gas-liquid mixture fluid storage tank;

a drainage opening positioned in a lower part of the central axis line of the gas-liquid mixture fluid storage tank, the drainage opening penetrating the fourth wall surface;

a storage tank discharge pipe connected to the storage tank discharge opening; and a drainage pipe connected to the drainage opening.

A twelfth aspect of the present invention is a micro-bubble generation device, including:

a micro-bubble generator provided with a cylindrical gas-liquid swirl chamber having a space in which a gas-liquid mixture fluid is capable of swirling, a gas-liquid introduction cylinder including a gas-liquid introduction opening for introducing the gas-liquid mixture fluid along a line tangent to an inner surface of the gas-liquid swirl chamber, a first wall surface orthogonal to a surface in which the gas-liquid introduction opening is arranged, a second wall surface facing the first wall surface, the second wall surface being positioned close to the gas-liquid introduction opening, and a tubular gas-liquid discharge opening positioned on a central axis line of the cylindrical gas-liquid swirl chamber, the gas-liquid discharge opening penetrating the second wall surface and reaching to a position close to the first wall surface;

a pump for supplying the fluid to the micro-bubble generator;

a suction piping connected to a suction opening of the pump;

a discharge piping connected to a discharge opening of the pump and connected to the gas-liquid introduction opening;

a gas-liquid ejection opening positioned on a negative pressure axis formed by a swirl flow of micro-bubble containing fluid discharged from the micro-bubble generator;

a cylindrical casing forming a gas-liquid mixture fluid storage tank accommodating the micro-bubble generator and storing the micro-bubble containing fluid ejected from the gas-liquid ejection opening;

a semi-spherical third wall surface forming an upper part of the gas-liquid mixture fluid storage tank;

a storage tank discharge opening positioned in an upper part of a central axis line of the gas-liquid mixture fluid storage tank, the storage tank discharge opening penetrating the third wall surface;

a semi-spherical fourth wall surface forming a lower part of the gas-liquid mixture fluid storage tank;

a drainage opening positioned in a lower part of the central axis line of the gas-liquid mixture fluid storage tank, the drainage opening penetrating the fourth wall surface;

a storage tank discharge pipe connected to the storage tank discharge opening; and a drainage pipe connected to the drainage opening, wherein the gas-liquid mixture fluid introduced from the gas-liquid introduction opening circulates around a circumference of the gas-liquid discharge opening, then turns backward at the first wall surface, flows in from an opened one end of the gas-liquid discharge opening, and flows from the one end of the gas-liquid discharge opening to the other end.

It should be noted that one example of other aspects may be a micro-bubble generation device, including:

a micro-bubble generator provided with a cylindrical gas-liquid swirl chamber having a space in a which gas-liquid mixture fluid is capable of swirling, a cylindrical casing provided with the gas-liquid swirl chamber, a gas-liquid introduction cylinder including a gas-liquid introduction opening for introducing the gas-liquid mixture fluid along a line tangent to an inner surface of the gas-liquid swirl chamber, a first wall surface orthogonal to a surface in which the gas-liquid introduction opening is arranged, a second wall surface facing the first wall surface, the second wall surface being positioned close to the gas-liquid introduction opening, and a gas-liquid discharge opening positioned on a central axis line of the cylindrical gas-liquid swirl chamber, the gas-liquid discharge opening penetrating the second wall surface and reaching to a position close to the first wall surface;

a pump for supplying the fluid to the micro-bubble generator;

a suction piping connected to a suction opening of the pump;

a discharge piping connected to a discharge opening of the pump and connected to the gas-liquid introduction opening;

a gas-liquid ejector provided with a gas-liquid ejection opening positioned on a negative pressure axis formed by a swirl flow of micro-bubble containing fluid discharged from the micro-bubble generator;

a cylindrical casing forming a gas-liquid mixture fluid storage tank accommodating the micro-bubble generation device and storing the micro-bubble containing fluid ejected from the gas-liquid ejection opening;

a semi-spherical third wall surface forming an upper part of the gas-liquid mixture fluid storage tank;

a storage tank discharge opening positioned in an upper part of a central axis line of the gas-liquid mixture fluid storage tank, the storage tank discharge opening penetrating the third wall surface;

a semi-spherical fourth wall surface forming a lower part of the gas-liquid mixture fluid storage tank;

a drainage opening positioned in a lower part of the central axis line of the gas-liquid mixture fluid storage tank, the drainage opening penetrating the fourth wall surface;

a storage tank discharge pipe connected to the storage tank discharge opening; and a drainage pipe connected to the drainage opening.

Effects of the Invention

According to the present invention, the micro-bubble generator capable, etc., of reducing the size of the generated micro bubbles can be obtained.

Further other objects, characteristics, or advantages of the present invention will be elucidated by detailed description based on an embodiment of the present invention described later and the attached drawings.

MODES FOR CARRYING OUT THE INVENTION

[Outline]

Figure 1:
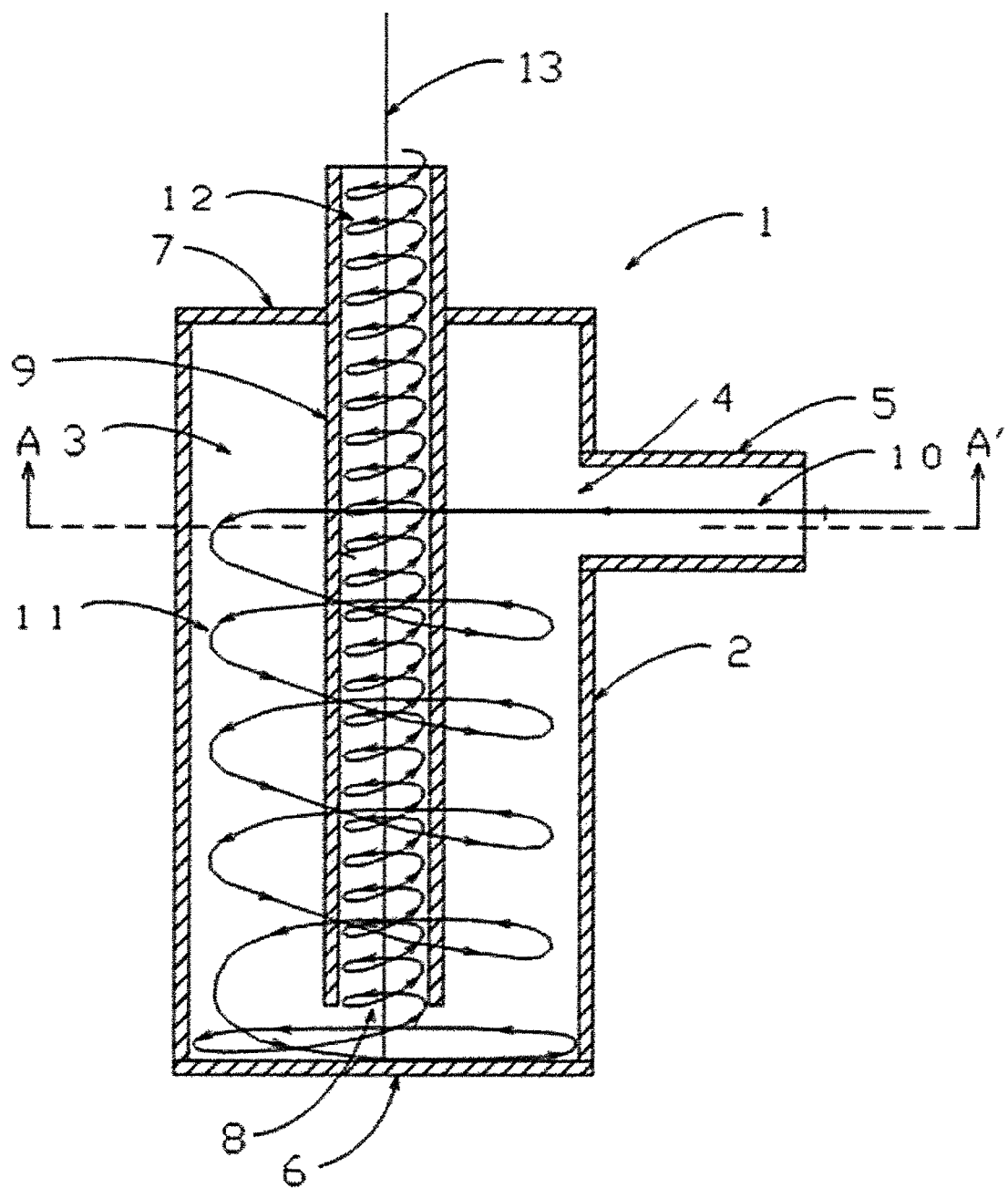
FIG. 1 is an illustrative view showing a configuration of a micro-bubble generator.
Figure 2:
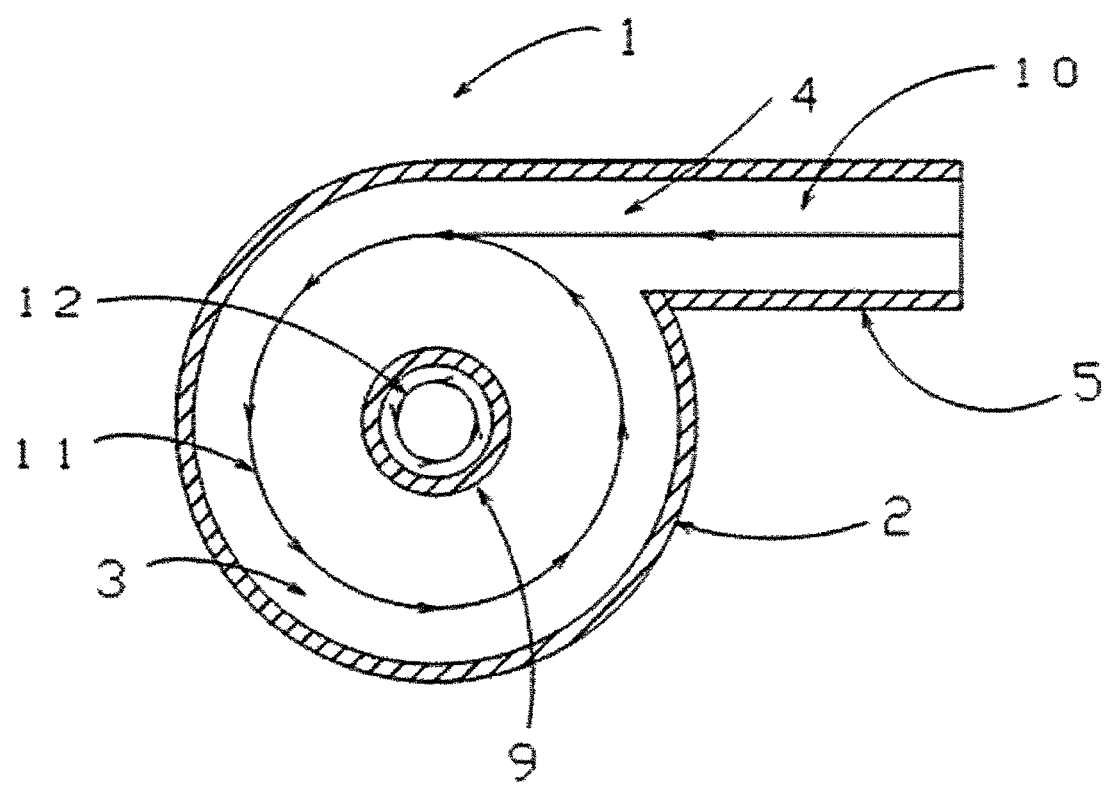
FIG. 2 is an illustrative view showing the configuration of the micro-bubble generator.
Figure 3:
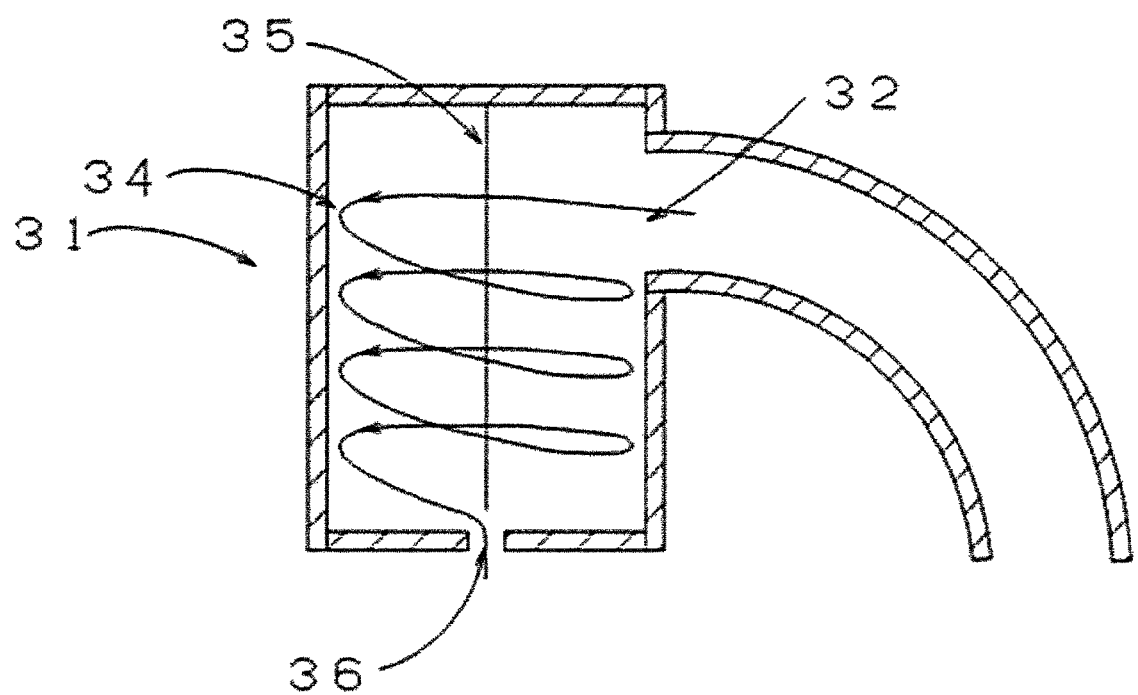
FIG. 3 is an illustrative view showing the configuration of the micro-bubble generator.

Any of the conventional swirl type micro-bubble generation devices reduces the size of bubbles but requires a great deal of energy for generation and does not efficiently generate bubbles having a particle size of a nanometer order. Thus, an object is to provide a more energy-efficient micro-bubble generator capable of efficiently generating bubbles having a particle size of a nanometer order, and a micro-bubble generation device provided with the micro-bubble generator.

For example, one micro-bubble generator 1 of the present embodiment includes a gas-liquid discharge cylinder 9 provided with a gas-liquid discharge opening 8 penetrating a second wall surface 7 positioned on a central axis line of a cylindrical gas-liquid swirl chamber 3 and reaching to a position close to a first wall surface 6. Thus, gas-liquid mixture fluid 10 introduced from a fluid introduction opening 4 so as to go along an inner surface of a cylindrical casing 2 between the gas-liquid discharge cylinder 9 and the cylindrical casing 2 turns backward at the first wall surface 6 while generating an outer swirl flow 11, and then the gas-liquid mixture fluid 10 passes through an interior of the gas-liquid discharge cylinder 9 provided with the gas-liquid discharge opening 8 while generating an inner swirl flow 12, and is discharged from the cylindrical gas-liquid swirl chamber 3. Thereby, the flows having contradictory vectors can be prevented from being adjacent to each other, so that a decrease in a flow rate of both the outer swirl flow 11 and the inner swirl flow 12 can be prevented, and hence the outer swirl flow 11 and the inner swirl flow 12 which are further rectified can be generated. Therefore, regarding the gas-liquid mixture fluid 10 introduced from the fluid introduction opening 4, swirl force can be applied to the gas-liquid mixture fluid 10 in the gas-liquid swirl chamber 3 more efficiently at lower pressure than the conventional swirl type micro-bubble generation devices. Thus, larger shear force is generated in a gas contained in the gas-liquid mixture fluid 10, so that size reduction in bubbles is facilitated.

It should be noted that the fluid includes fluid in which a gas is mixed into a liquid, fluid in which a gas is melted into a liquid, and the like. Examples of a liquid can be water, a solvent, gasoline, and the like. Examples of a gas can be nitrogen, oxygen, carbon dioxide, ozone, ethylene, hydrogen, and the like. Here, a case where the gas-liquid mixture fluid is introduced into the micro-bubble generator will be mainly described.

Hereinafter, the embodiment of the present invention will be described in detail with reference to the drawings.

[Micro-Bubble Generator]

FIG. 1 shows a configuration of the micro-bubble generator of the present embodiment. A shows a vertically sectional view thereof, and B shows a section by the line A-A' shown in the figure.

In the figure, the micro-bubble generator 1 is configured from the cylindrical casing 2, the cylindrical gas-liquid swirl chamber 3 having a space in which the gas-liquid mixture fluid 10 is capable of swirling, the fluid introduction opening 4 for introducing the gas-liquid mixture fluid 10 along a line tangent to the inner surface of the gas-liquid swirl chamber 3, a gas-liquid introduction cylinder 5 provided with the fluid introduction opening 4, the first wall surface 6 orthogonal to a surface of the gas-liquid swirl chamber 3 in which the fluid introduction opening 4 is arranged, the second wall surface 7 facing the wall surface, the second wall surface being positioned close to the fluid introduction opening 4, the gas-liquid discharge opening 8 positioned on the central axis line of the cylindrical gas-liquid swirl chamber 3, the gas-liquid discharge opening penetrating the second wall surface 7 and reaching to the position close to the first wall surface 6, and the gas-liquid discharge cylinder 9 provided with the gas-liquid discharge opening 8.

As shown in the figure, the gas-liquid discharge cylinder 9 is positioned on the central axis line of the cylindrical gas-liquid swirl chamber 3 inside the gas-liquid swirl chamber 3 of the cylindrical casing 2, penetrates the second wall surface 7, and reaches to the position close to the first wall surface 6. By these two cylinders, the micro-bubble generator 1 forms a double-cylinder structure. The gas-liquid discharge opening 8 provided in the gas-liquid discharge cylinder 9 is provided at the position close to the first wall surface 6.

The gas-liquid mixture fluid 10 introduced from the fluid introduction opening 4 of the micro-bubble generator 1 with the above configuration flows between the gas-liquid discharge cylinder 9 positioned on the central axis line of the cylindrical gas-liquid swirl chamber 3 and the cylindrical casing 2 so as to go along the inner surface of the cylindrical casing. Thus, the rectified outer swirl flow 11 can be generated in the cylindrical gas-liquid swirl chamber 3.

The outer swirl flow 11 goes toward the first wall surface 6 of the cylindrical gas-liquid swirl chamber 3 and turns backward at the first wall surface 6, and swirl speed is increased inside the gas-liquid discharge cylinder 9 having a smaller diameter than the cylindrical casing 2, so that the inner swirl flow 12 is formed. This inner swirl flow 12 forms a high-speed swirl flow, and a negative pressure hollow portion 13 is formed in the vicinity of a center thereof by centrifugal force.

As described above, the micro-bubble generator 1 includes the gas-liquid discharge cylinder 9 provided with the gas-liquid discharge opening 8 penetrating the second wall surface 7 positioned on the central axis line of the cylindrical gas-liquid swirl chamber 3 and reaching to the position close to the first wall surface 6. Thus, the gas-liquid mixture fluid 10 introduced from the fluid introduction opening 4 so as to go along the inner surface of the cylindrical casing 2 between the gas-liquid discharge cylinder 9 and the cylindrical casing 2 turns backward at the first wall surface 6 while generating the outer swirl flow 11, and then the gas-liquid mixture fluid 10 passes through the interior of the gas-liquid discharge cylinder 9 provided with the gas-liquid discharge opening 8 while generating the inner swirl flow 12, and is discharged from the cylindrical gas-liquid swirl chamber 3. Thereby, the flows having contradictory vectors can be prevented from being adjacent to each other, so that the decrease in the flow rate of both the outer swirl flow 11 and the inner swirl flow 12 can be prevented, and hence the outer swirl flow 11 and the inner swirl flow 12 which are further rectified can be generated. Therefore, regarding the gas-liquid mixture fluid 10 introduced from the fluid introduction opening 4, the swirl force can be applied to the gas-liquid mixture fluid 10 in the gas-liquid swirl chamber 3 more efficiently at lower pressure than the conventional swirl type micro-bubble generation devices. Thus, larger shear force is generated in the gas contained in the gas-liquid mixture fluid 10, so that the size reduction in the bubbles is facilitated.

[Micro-Bubble Generation Device]

Figure 4:
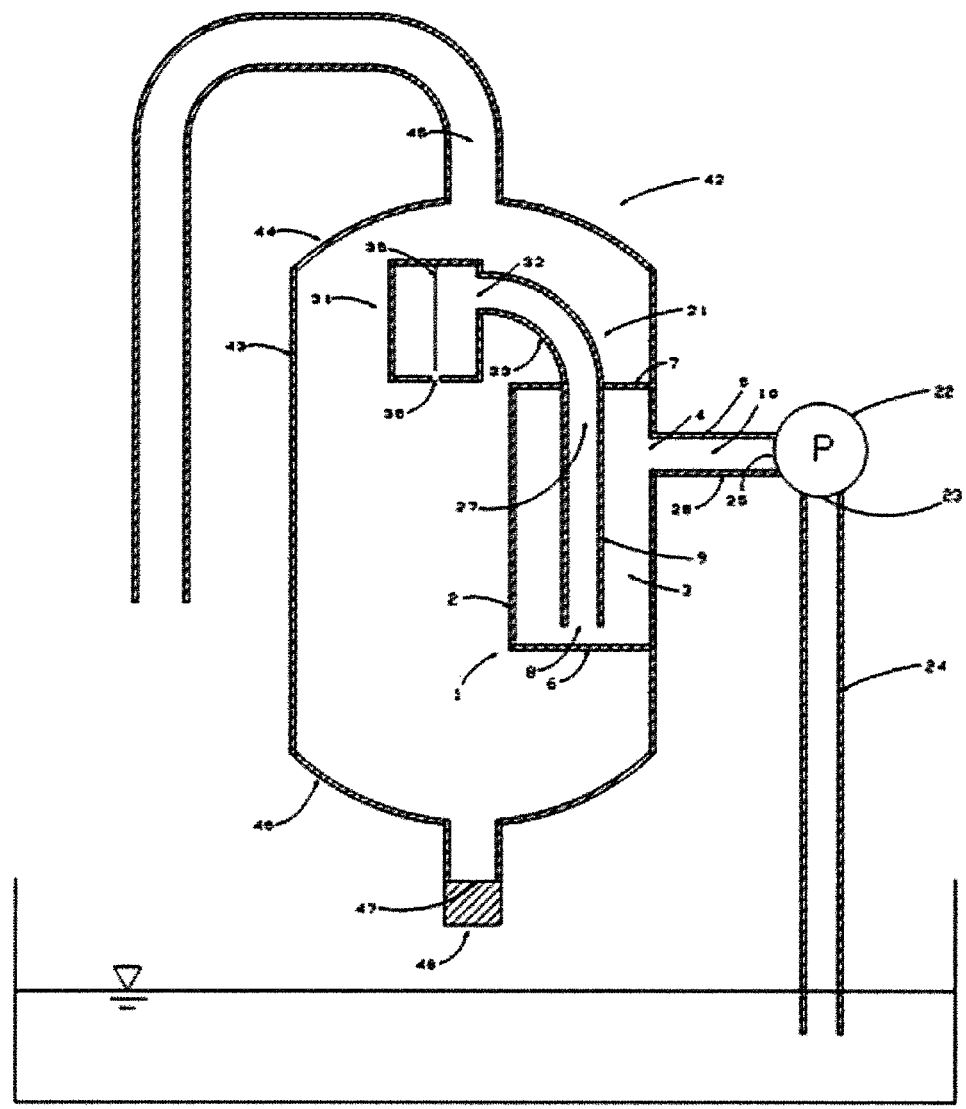
FIG. 4 is an illustrative view showing a configuration of a swirl type micro-bubble generation device.

FIG. 4 is an illustrative view showing a configuration of a micro-bubble generation device 21 provided with the micro-bubble generator 1 shown in FIG. 1.

In the figure, the micro-bubble generation device provided with the micro-bubble generator 1 supplies micro-bubble containing fluid 27 from the micro-bubble generator 1, a pump 22 for supplying the gas-liquid mixture fluid 10 to the micro-bubble generator 1, a suction piping 24 connected to a suction opening 23 of the pump 22, a discharge piping 26 connected to a discharge opening 25 of the pump and connected to the fluid introduction opening 4 of the micro-bubble generator 1, and the gas-liquid discharge opening 8 of the micro-bubble generator 1.

A gas-liquid ejector 31 has a discharge piping 33 connected to a gas-liquid introduction opening 32, and a gas-liquid ejection opening 36 positioned on a negative pressure axis 35 formed by a swirl flow 34 of the micro-bubble containing fluid 27 discharged from the micro-bubble generator 1, and is capable of efficiently diffusing the micro-bubble containing fluid 27 supplied from the micro-bubble generator 1 to a gas-liquid mixture fluid storage tank.

By providing a cylindrical casing 43 provided with a gas-liquid mixture fluid storage tank 42 accommodating the micro-bubble generation device 21 and storing the micro-bubble containing fluid 27 ejected from the gas-liquid ejection opening 36, a semi-spherical fourth wall surface 44 positioned in an upper part of the gas-liquid mixture fluid storage tank 42, a storage tank discharge opening 45 positioned in an upper part of a central axis line of the gas-liquid mixture fluid storage tank 42, the storage tank discharge opening 45 penetrating the third wall surface 44, a semi-spherical fourth wall surface 46 positioned in a lower part of the gas-liquid mixture fluid storage tank 42, and a drainage opening 47 positioned in a lower part of the central axis line of the gas-liquid mixture fluid storage tank 42, the drainage opening 47 penetrating the fourth wall surface, the micro-bubble containing fluid 27 can be obtained from the storage tank discharge opening 45. It should be noted that a storage tank discharge tube connected to the storage tank discharge opening 45 and a drainage tube connected to the drainage opening 47 may be provided.

In the conventional swirl type micro-bubble generation devices, there is a need for directly immersing a generator in water in order to generate micro bubbles. However, in the micro-bubble generation device 1 of the present embodiment, by providing the micro-bubble containing fluid storage tank 42, the micro-bubble containing fluid 27 can be obtained without immersing the release port 47 of the storage tank discharge pipe 46.

A suction tube portion may be protrudingly provided in a predetermined part of the suction piping connected to the suction opening of the pump, or a gas supply opening may be provided in a casing part of the pump. Alternatively, a gas supply piping connected to the gas supply opening and connected to a gas discharge opening of a gas supply pump, or a gas supply piping connected to a gas discharge opening of a gas container may be provided.

[Particle Size Distribution of Generated Micro Bubbles]

Figure 5:
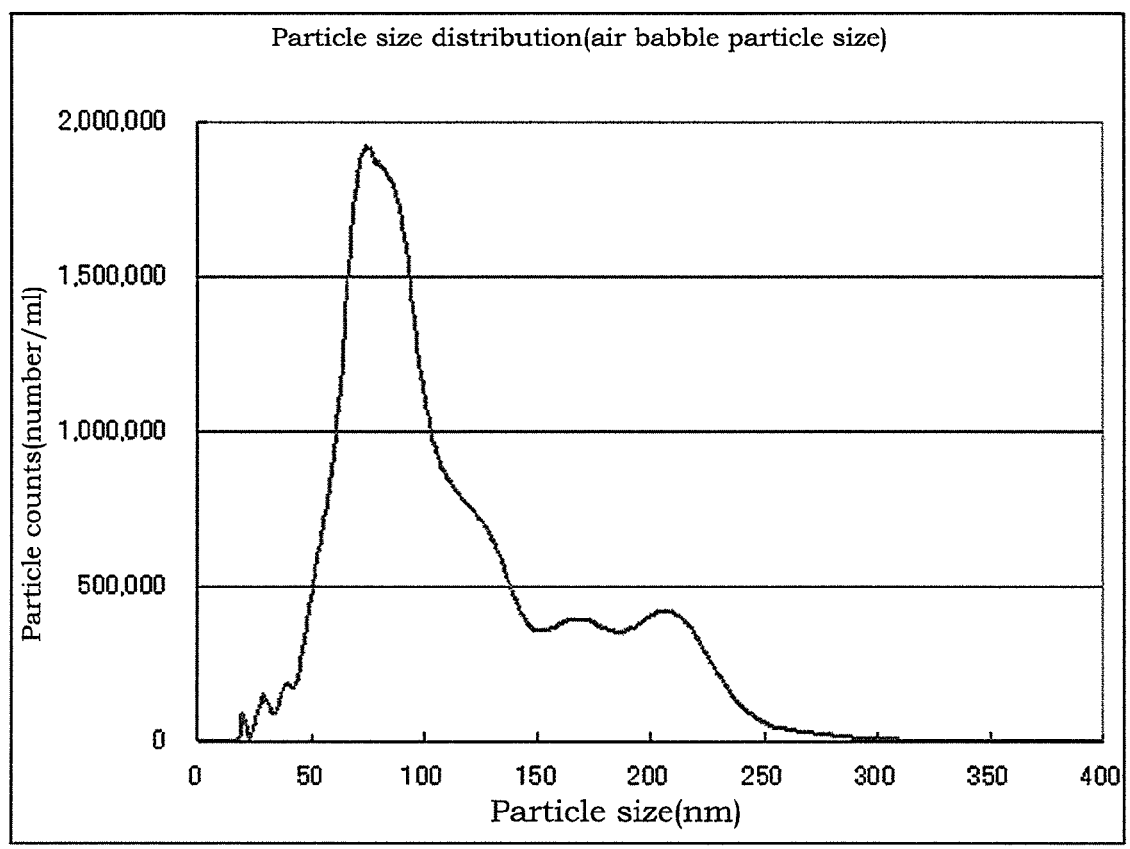
FIG. 5 is a graph showing particle size distribution of micro bubbles generated in the micro-bubble generation device.

FIG. 5 is a graph showing particle size distribution of micro bubbles generated in the micro-bubble generation device.

As shown in the figure, many micro bubbles were observed within a range of particle size from 10 nm or more to 300 nm or less, and the number thereof was 100 million or more. Many micro bubbles were generated within a range of particle size from 50 nm or more to 150 nm or less, further, within a range of particle size from 50 nm or more to 110 nm or less, and furthermore, within a range of particle size around 100 nm. This data indicates that bubbles having a particle size of a nanometer order can be efficiently generated by the technique of the above embodiment.

[Material]

Metal materials and various plastic materials can be used as a material of the above described parts of the micro-bubble generator, etc. For example, manufacturing can be performed with an alloy of iron, chromium, and nickel, stainless steel, SUS304, SUS316. The manufacturing can also be performed with a resin material such as Teflon (registered trademark) and polycarbonate. Moreover, Teflon-coating, surface coating, electrostatic coating, plating, or the like may be performed for the micro-bubble generator, etc.

[Uses]

Many uses of the above technique are considered. For example, there is a possibility that the technique can be utilized in the following fields.

Application to a food and agricultural field includes inactivation of norovirus by micro bubbles, inactivation of viruses inside oysters, sterilization and purification of hydroponic culture solutions using micro-bubble ozone, sterilization of culture solutions and roots by micro-bubble ozone, and agricultural utilization of nano-bubbles. Application to a medical field includes clinical application of a micro-bubble ultrasonic contrast agent and the like, adaptation of contrast-enhanced ultrasound to a hepatic disorder diagnosis, a micro-bubble ultrasonic contrast agent, a clinical diagnosis, an angiogenic remedy using breakage of micro bubbles, an angiogenic mechanism by ultrasound and micro bubbles, ultrasonic manipulation of micro bubbles, acoustic radiation pressure acting on micro bubbles in ultrasound, capture of micro bubbles by ultrasound, ultrasonic capture of a yeast using micro bubbles, gene transfer using ultrasound and micro bubbles, cavitation enhancement using both ultrasound and micro bubbles (contrast agent), gene transfer by using both ultrasonic stimulation and micro bubbles, application to an animal model, and medical treatment for cutaneous disorder and skin cleaning of a pet by micro bubbles. Application to an environmental field includes a hybrid-type environmental treatment technology using a micro-bubble method, introduction of excited oxygen micro bubbles to a liquid phase, decontamination of oil-contaminated soil by micro bubbles, decontamination of a contaminated site by a bubble entrainment method, purification of water quality, degradation of in-water organic substances and harmful substances by micro bubbles, degradation of chemical substances such as organic substances, degradation of harmful substances by ozone, dissolution of a dysoxic water mass by micro bubbles, generation of micro bubbles in a canal, application of micro bubbles to an artificial brackish lake, application of micro bubbles in a shipping route, water quality purification and increase in a dissolved oxygen concentration of lakes, marshes, and rivers, an oil-water separation technology in oil-water emulsion, treatment of dyehouse wastewater by a biofiltration device using carbon fiber and microbubbles, a cleaning technique utilizing micro bubbles, an eco-friendly cleaning technique by micro bubbles, removal of oil stains by micro bubbles, a washer-dryer in which water-saving is realized by injecting micro-bubble shape ozone, utilization for ships, a ship resistance reduction technique by micro bubbles, and development of a ship in-water noise predicting method by bubble dynamics. Device development includes a low-power micro-bubble generation device, a Bubble Jet type air-lift pump (Bubble Jet is a registered trademark), combination with micro-bubble generation through an orifice, and a household cleaning device utilizing micro bubbles. Further, there is a possibility that the technique can be applied to environmental improvement in a semi-closed water area utilizing micro bubbles, gas hydrate generation utilizing micro bubbles, a water treatment technique utilizing crushing of micro bubbles, preservative-free kamaboko (Japanese processed seafood product) by oxygen nano-bubbles, and the like.

CONCLUSION

The swirl type micro-bubble generator of the present embodiment has the cylindrical casing, the cylindrical gas-liquid swirl chamber having the space in which the gas-liquid mixture fluid is capable of swirling, the fluid introduction opening for introducing the gas-liquid mixture fluid along the line tangent to the inner surface of the gas-liquid swirl chamber, the gas-liquid introduction cylinder provided with the fluid introduction opening, the first wall surface orthogonal to the surface of the gas-liquid swirl chamber in which the fluid introduction opening is arranged, the second wall surface facing the wall surface, the second wall surface being positioned close to the fluid introduction opening, the gas-liquid discharge opening positioned on the central axis line of the cylindrical gas-liquid swirl chamber, the gas-liquid discharge opening penetrating the second wall surface and reaching to the position close to the first wall surface, and the gas-liquid discharge cylinder provided with the gas-liquid discharge opening.

According to the present embodiment, by providing the gas-liquid discharge cylinder provided with the gas-liquid discharge opening penetrating the second wall surface positioned on the central axis line of the cylindrical gas-liquid swirl chamber and reaching to the position close to the first wall surface, the gas-liquid mixture fluid introduced from the fluid introduction opening so as to go along the inner surface of the cylindrical casing between the gas-liquid discharge cylinder and the cylindrical casing flows toward the first wall surface while generating the swirl flow. Thus, the rectified swirl flow can be generated without providing a structure for rectification on an inner wall surface of the cylindrical gas-liquid swirl chamber.

By providing the gas-liquid discharge cylinder provided with the gas-liquid discharge opening penetrating the second wall surface positioned on the central axis line of the cylindrical gas-liquid swirl chamber and reaching to the position close to the first wall surface, the mixture fluid introduced from the fluid introduction opening so as to go along the inner surface of the cylindrical casing between the gas-liquid discharge cylinder and the cylindrical casing turns backward at the first wall surface while generating the swirl flow, then passes through the interior of the gas-liquid discharge cylinder provided with the gas-liquid discharge opening while generating the swirl flow, and is discharged from the cylindrical gas-liquid swirl chamber. Thereby, the flows having contradictory vectors can be prevented from being adjacent to each other, so that the decrease in the flow rate of the gas-liquid mixture fluid flowing toward the first wall surface introduced from the introduction opening can be prevented.

By providing the gas-liquid discharge cylinder provided with the gas-liquid discharge opening penetrating the second wall surface positioned on the central axis line of the cylindrical gas-liquid swirl chamber and reaching to the position close to the first wall surface, the gas-liquid mixture fluid introduced from the fluid introduction opening so as to go along the inner surface of the cylindrical casing between the gas-liquid discharge cylinder and the cylindrical casing turns backward at the first wall surface while generating the swirl flow, then passes through the interior of the gas-liquid discharge cylinder provided with the gas-liquid discharge opening while generating the swirl flow, and is discharged from the cylindrical gas-liquid swirl chamber. Thereby, the flows having contradictory vectors can be prevented from being adjacent to each other, so that the decrease in the flow rate of the gas-liquid mixture fluid passing through the interior of the gas-liquid discharge cylinder provided with the gas-liquid discharge opening while generating the swirl flow can be prevented.

As described above, in the conventional devices, a mechanism for rectification is provided in order to generate a swirl flow, and a swirl flow is generated to a wall surface orthogonal to a surface in which an introduction opening for introducing a liquid or the like is arranged, the wall surface being away from the introduction opening. The liquid or the like collides with the wall surface, then turns backward, goes toward the side of a wall surface in which a discharge opening is provided, and flows toward the discharge opening while generating an inverse swirl flow inside the swirl flow flowing toward the wall surface away from the introduction opening. Thus, since flows of contradictory vectors are adjacent to each other, a loss is generated in a flow rate of both the swirl flows.

A swirl flow rate of the swirl flow of the fluid is decreased by the above loss, so that there is a need for a great deal of energy in order to pressurize the fluid by a pump and send the fluid into a gas-liquid swirl chamber to generate the swirl flow.

However, according to the present embodiment, by providing the gas-liquid discharge cylinder provided with the gas-liquid discharge opening penetrating the second wall surface positioned on the central axis line of the cylindrical gas-liquid swirl chamber and reaching to the position close to the first wall surface, the mixture fluid introduced from the fluid introduction opening so as to go along the inner surface of the cylindrical casing between the gas-liquid discharge cylinder and the cylindrical casing turns backward at the first wall surface while generating the swirl flow, then passes through the interior of the gas-liquid discharge cylinder provided with the gas-liquid discharge opening while generating the swirl flow, and the gas-liquid mixture fluid is discharged from the cylindrical gas-liquid swirl chamber as the micro-bubble containing fluid. Thereby, the flows having contradictory vectors can be prevented from being adjacent to each other, so that the decrease in the flow rate of both the swirl flows can be prevented, and hence the size reduction in the bubbles can be facilitated with small energy.

According to the present embodiment, by isolating the path of the introduced fluid, a loss of kinetic energy of the swirl flow of the fluid can be reduced. Thus, the micro-bubble generator capable of reducing the size of the generated micro bubbles can be obtained. Further, according to the present embodiment, by isolating a path of the introduced fluid, a loss of kinetic energy of the swirl flow of the fluid can be reduced. Thus, the micro-bubble generator capable of reducing the size of the generated micro bubbles can be obtained.

By providing the micro-bubble containing fluid storage tank, micro bubbles can be generated, for example, not only for a water tank.

[Interpretation, etc.]

The present invention is described above with reference to the specific embodiment. However, it is obvious that those skilled in the art can correct or substitute for the embodiment within a range not departing from the gist of the present invention. That is, the present invention is disclosed in a form of exemplification, and descriptive contents of the present description should not be interpreted in a limited way. In order to determine the gist of the present invention, the paragraphs corresponding to the claims described at the beginning should be taken into consideration.

Although it is clear that the embodiment for explaining this invention achieves the above object, it is also understood that those skilled in the art can make many modifications and implement other embodiments. The elements or the components of the embodiment for the claims, the description, the drawings, and explanation may be adopted with one of the others or in combination. The claims are intended to include such modifications and other embodiments within a range thereof. These are included in the technical thought and the technical scope of this invention.

INDUSTRIAL APPLICABILITY

The above technique is a beneficial technique for efficiently generating micro bubbles having a particle size of a nanometer order in a fluid. For example, the micro-bubble containing fluid supplied by the micro-bubble generation device provided with the micro-bubble generator of the present invention extends the possibility of effective utilization of micro bubbles in a wide range of fields such as oxygen supply to a water environment, medical treatment, welfare, cleaning, chemical industry, wastewater treatment, bioactivity, fishery, and agriculture.

The invention claimed is:

1. A micro-bubble generation device, comprising:
   a micro-bubble generator provided with a cylindrical gas-liquid swirl chamber having a space in which a gas-liquid mixture fluid is capable of swirling, a gas-liquid introduction cylinder including a gas-liquid introduction opening for introducing the gas-liquid mixture fluid along a line tangent to an inner surface of the gas-liquid swirl chamber, a gas-liquid introduction cylinder including a gas-liquid introduction opening for introducing the gas-liquid mixture fluid along a line tangent to an inner surface of the gas-liquid swirl chamber, a first wall surface orthogonal to a surface in which the gas-liquid introduction opening is arranged, a second wall surface facing the first wall surface, the second wall surface being positioned close to the gas-liquid introduction opening, and a gas-liquid discharge opening positioned on a central axis line of the cylindrical gas-liquid swirl chamber, the gas-liquid discharge opening penetrating the second wall surface and reaching to a position close to the first wall surface;
   a pump for supplying the fluid to the micro-bubble generator;
   a suction piping connected to a suction opening of the pump;
   a discharge piping connected to a discharge opening of the pump and connected to the gas-liquid introduction opening;
   a cylindrical casing forming a gas-liquid mixture fluid storage tank accommodating the micro-bubble generator and storing micro-bubble containing fluid discharged from the micro-bubble generator;
   a semi-spherical third wall surface forming an upper part of the gas-liquid mixture fluid storage tank;
   a storage tank discharge opening positioned in an upper part of a central axis line of the gas-liquid mixture fluid storage tank, the storage tank discharge opening penetrating the third wall surface;
   a semi-spherical fourth wall surface forming a lower part of the gas-liquid mixture fluid storage tank;
   a drainage opening positioned in a lower part of the central axis line of the gas-liquid mixture fluid storage tank, the drainage opening penetrating the fourth wall surface;
   a storage tank discharge pipe connected to the storage tank discharge opening; and
   a drainage pipe connected to the drainage opening.

2. A micro-bubble generation device, comprising:
   a micro-bubble generator provided with a cylindrical gas-liquid swirl chamber having a space in which a gas-liquid mixture fluid is capable of swirling, a gas-liquid introduction cylinder including a gas-liquid introduction opening for introducing the gas-liquid mixture fluid along a line tangent to an inner surface of the gas-liquid swirl chamber, a first wall surface orthogonal to a surface in which the gas-liquid introduction opening is arranged, a second wall surface facing the first wall surface, the second wall surface being positioned close to the gas-liquid introduction opening, and a tubular gas-liquid discharge opening positioned on a central axis line of the cylindrical gas-liquid swirl chamber, the gas-liquid discharge opening penetrating the second wall surface and reaching to a position close to the first wall surface;
   a pump for supplying the fluid to the micro-bubble generator;
   a suction piping connected to a suction opening of the pump;
   a discharge piping connected to a discharge opening of the pump and connected to the gas-liquid introduction opening;
   a gas-liquid ejection opening positioned on a negative pressure axis formed by a swirl flow of micro-bubble containing fluid discharged from the micro-bubble generator;
   a cylindrical casing forming a gas-liquid mixture fluid storage tank accommodating the micro-bubble generator and storing the micro-bubble containing fluid ejected from the gas-liquid ejection opening;
   a semi-spherical third wall surface forming an upper part of the gas-liquid mixture fluid storage tank;
   a storage tank discharge opening positioned in an upper part of a central axis line of the gas-liquid mixture fluid storage tank, the storage tank discharge opening penetrating the third wall surface;
   a semi-spherical fourth wall surface forming a lower part of the gas-liquid mixture fluid storage tank;
   a drainage opening positioned in a lower part of the central axis line of the gas-liquid mixture fluid storage tank, the drainage opening penetrating the fourth wall surface;
   a storage tank discharge pipe connected to the storage tank discharge opening; and
   a drainage pipe connected to the drainage opening, wherein
   the gas-liquid mixture fluid introduced from the gas-liquid introduction opening circulates around a circumference of the gas-liquid discharge opening, then turns backward at the first wall surface, flows in from an opened one end of the gas-liquid discharge opening, and flows from the one end of the gas-liquid discharge opening to the other end.

* * * * *